(12) United States Patent
Sato et al.

(10) Patent No.: US 7,905,278 B2
(45) Date of Patent: Mar. 15, 2011

(54) VEHICULAR AIR CONDITIONER

(75) Inventors: Seiji Sato, Tochigi (JP); Ryuji Tsukuda, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 1093 days.

(21) Appl. No.: 11/599,594

(22) Filed: Nov. 15, 2006

(65) Prior Publication Data

US 2007/0107892 A1    May 17, 2007

(30) Foreign Application Priority Data

Nov. 16, 2005 (JP) ................. 2005-331905

(51) Int. Cl.
*B60H 1/00* (2006.01)
(52) U.S. Cl. ........... 165/204; 165/202; 165/42; 454/121
(58) Field of Classification Search ............. 165/42, 165/43, 44, 202, 203, 204; 454/121
See application file for complete search history.

(56) References Cited

U.S. PATENT DOCUMENTS

| | | | | |
|---|---|---|---|---|
| 4,665,971 A * | 5/1987 | Sakurai | ............ | 165/203 |
| 4,899,809 A * | 2/1990 | Takenaka et al. | ............. | 165/202 |
| 5,042,566 A * | 8/1991 | Hildebrand | ............ | 165/42 |
| 5,601,142 A * | 2/1997 | Hildebrand et al. | ............ | 165/42 |
| 5,673,964 A * | 10/1997 | Roan et al. | ............ | 454/121 |
| 5,687,790 A * | 11/1997 | Trame et al. | ............ | 165/42 |
| 5,711,368 A * | 1/1998 | Ito et al. | ............ | 165/42 |
| 5,727,731 A * | 3/1998 | Arakawa et al. | ............ | 165/43 |
| 5,775,407 A * | 7/1998 | Inoue | ............ | 165/42 |
| 5,862,677 A * | 1/1999 | Kim et al. | ............ | 165/42 |
| 6,179,044 B1 * | 1/2001 | Tabara | ............ | 165/42 |
| 6,244,335 B1 * | 6/2001 | Nakamura et al. | ............ | 165/203 |
| 6,415,851 B1 * | 7/2002 | Hall et al. | ............ | 165/42 |
| 6,415,856 B1 * | 7/2002 | Gilles | ............ | 165/203 |
| 6,415,857 B1 * | 7/2002 | Nakamura et al. | ............ | 165/42 |
| 6,439,296 B1 * | 8/2002 | Arold et al. | ............ | 165/42 |
| 6,463,998 B1 * | 10/2002 | Shindo | ............ | 165/42 |
| 6,598,670 B1 * | 7/2003 | Hashimoto et al. | ............ | 165/42 |
| 6,634,938 B2 * | 10/2003 | Vincent | ............ | 454/121 |
| 6,736,190 B2 * | 5/2004 | Natsume et al. | ............ | 165/42 |
| 6,769,978 B2 * | 8/2004 | Lacefield | ............ | 454/121 |
| 6,772,833 B2 * | 8/2004 | Auer et al. | ............ | 165/42 |
| 6,994,157 B1 * | 2/2006 | Arold | ............ | 165/43 |
| 7,156,166 B2 * | 1/2007 | Bendell et al. | ............ | 165/203 |
| 7,281,574 B2 * | 10/2007 | Shibata et al. | ............ | 165/42 |
| 7,726,391 B2 * | 6/2010 | Seo et al. | ............ | 165/202 |
| 2003/0094262 A1 | 5/2003 | Kondo | | |

FOREIGN PATENT DOCUMENTS

| | | |
|---|---|---|
| GB | 2 311 850 A | 10/1997 |
| JP | 2000-71748 A | 3/2000 |
| JP | 2000-238526 A | 9/2000 |
| JP | 2001-138728 A | 5/2001 |
| JP | 2004-058775 A | 2/2004 |
| JP | 2004-098964 A | 4/2004 |

* cited by examiner

*Primary Examiner* — Ljiljana (Lil) V Ciric
(74) *Attorney, Agent, or Firm* — Foley & Lardner LLP (57) ABSTRACT

A vehicular air conditioner having an air conditioner case including an air mix area, where a defroster opening, a front seat vent opening, a foot opening, and a back seat vent opening are located on the air conditioner case and configured to open and close the air mix area. A defroster door is configured to open and close the defroster opening. A vent foot switching door is configured to open and close the foot opening and the front seat vent opening selectively. A foot door is configured to open and close the foot opening. A back seat vent door is configured to open and close the back set vent opening. The back seat vent opening is positioned in a vicinity of the foot opening and the back seat vent door and the foot door are downstream from the vent foot switching door.

2 Claims, 11 Drawing Sheets

VEHICULAR AIR CONDITIONER

CROSS REFERENCE TO RELATED APPLICATION

This application is based upon and claims the benefit of priority from a Japanese Patent Application No. TOKUGAN 2005-331905, filed on Nov. 16, 2005; the entire contents of which are incorporated herein by reference.

BACKGROUND OF THE INVENTION

1. Field of the Invention

The present invention relates to a vehicular air conditioner that discharges conditioned air for ventilation toward a front seat and a back seat.

2. Description of the Related Art

Figure 1:
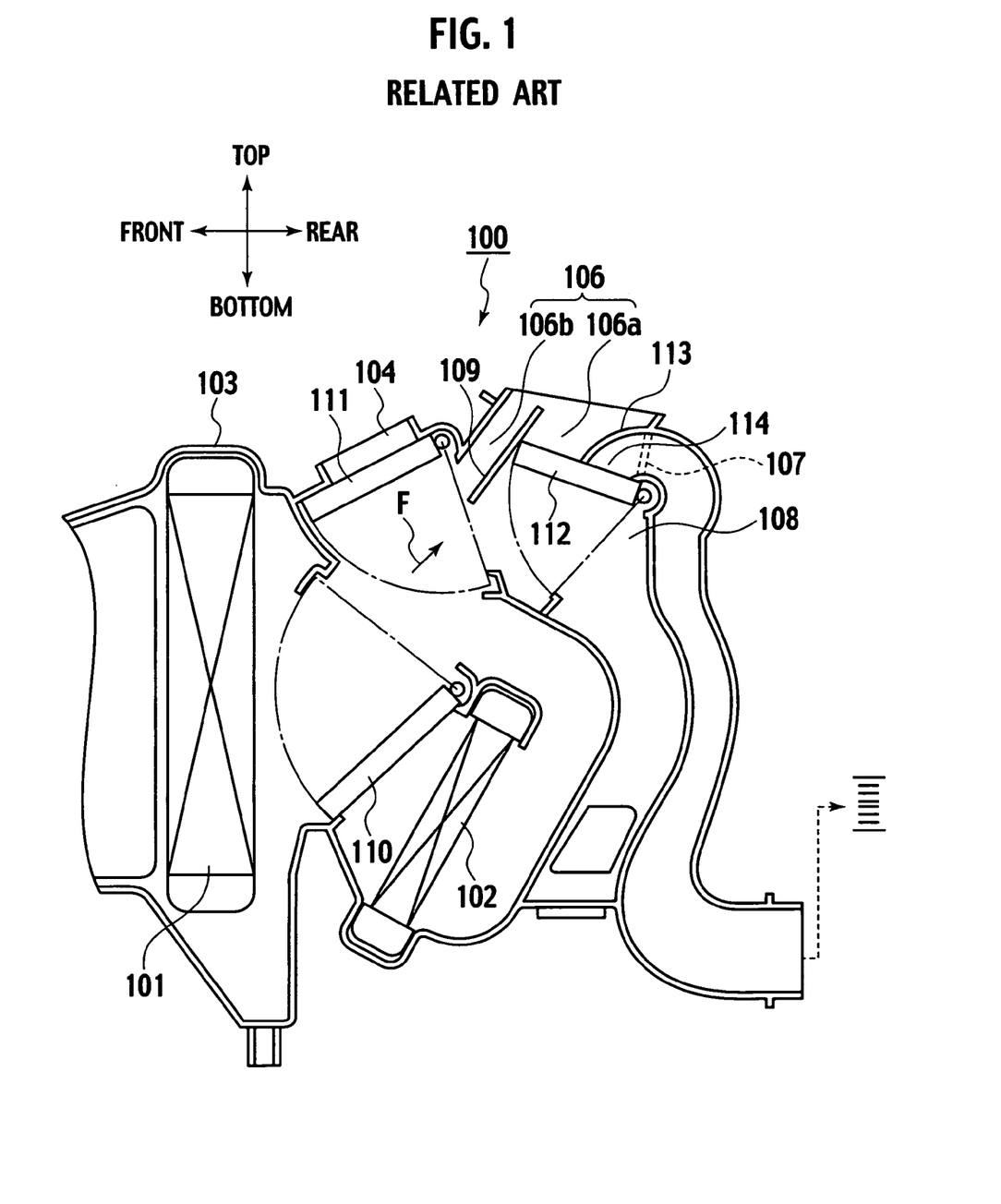
FIG. 1 is a schematic configuration diagram of an air conditioner unit of a conventional vehicular air conditioner.
Figure 2:
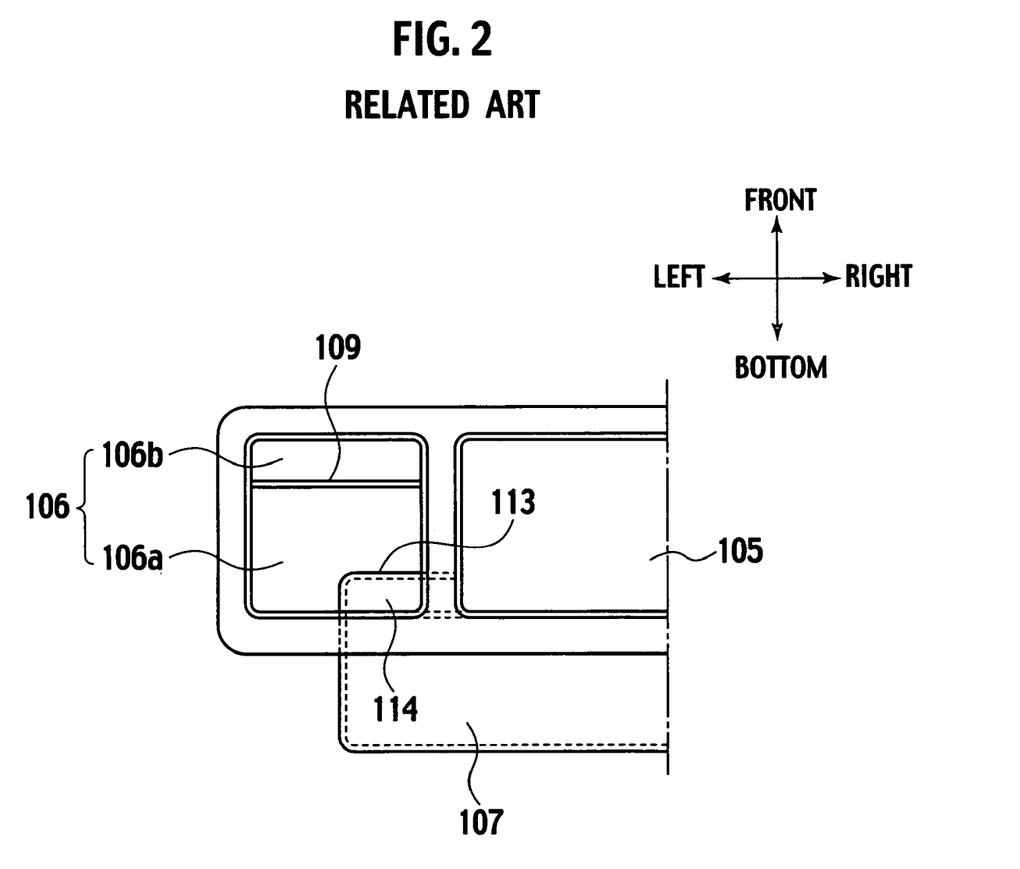
FIG. 2 is a view on arrow F in FIG. 1.

One of the above kinds of conventional vehicular air conditioners is disclosed in Japanese Patent Application Laid-open No. 2000-71748. As shown in FIG. 1, a vehicular air conditioner 100 includes an air conditioner case 103 incorporating a heater core 102 and an evaporator 101 which adjusts conditioned air to a predetermined temperature. The air conditioner case 103 is formed with a defroster opening 104 which introduces conditioned air to be discharged toward a front window glass of the vehicle, a front seat center vent opening 105 (shown in FIG. 2) which introduces conditioned air to be discharged toward an upper half of a body of a passenger on a front seat, and a pair of front seat side vent openings 106 which introduces conditioned air to be discharged toward the upper half of the body of the passenger on the front seat or a side window glass of the vehicle. The air conditioner case 103 is also formed with a back seat vent opening 107 which introduces conditioned air to be discharged toward an upper half of a body of a passenger on the back seat, and a foot opening 108 which introduces conditioned air to be discharged toward a lower half of the body of the passenger on the front seat. By a partitioning plate 109, each front seat side vent opening 106 is divided into a door opening/closing opening 106a which is opened and closed by a foot vent switching door 112, and a regular-opening 106b which is regularly opened irrespective of opening or closing of the foot vent switching door 112.

A mix door 110, a defroster door 111 and a foot vent switching door 112 are provided in the air conditioner case 103. The mix door 110 adjusts a ratio of conditioned air to be sent to the heater core 102 and conditioned air which bypasses the heater core 102. The defroster door 111 opens and closes the defroster opening 104. The foot vent switching door 112 opens and closes the front seat center vent opening 105, the door opening/closing opening 106a of the front seat side vent opening 106, the back seat vent opening 107, and the foot opening 108.

The front seat side vent opening 106 is partially formed with a back seat auxiliary vent opening 114 by a projecting guide wall 113. The back seat auxiliary vent opening 114 is in communication with a back seat vent blowout opening.

According to this structure, the foot opening 108 is fully opened in a vent fully-closed position (position shown in FIG. 1) of the foot vent switching door 112. Therefore, conditioned air is discharged into a passenger room from a foot blowout opening (not shown). Since the regular-opening 106b of the front seat side vent opening 106 is not closed even at the vent fully-closed position of the foot vent switching door 112, a portion of the conditioned air is discharged into the passenger room from the front seat side vent blowout opening (not shown). That is, conditioned air is discharged from the side vent blowout opening in all of air conditioning modes. This prevents fogging on a side window glass of the vehicle in a cold climate.

In the foot fully-closed position of the foot vent switching door 112, the front seat center vent opening 105, the front seat side vent opening 106 and the back seat vent opening 107 are fully opened. Therefore, conditioned air is discharged into the passenger room from vent blowout openings (not shown) of a front seat center vent, a front seat side vent and a back seat vent. Here, a portion of the conditioned air introduced into the front seat side vent opening 106 is introduced into the back seat vent opening 107 from the back seat auxiliary vent opening 114, and an amount of air flowing from the back seat vent blowout opening (not shown) is increased. A passage distance from the back seat vent opening 107 to the back seat vent blowout opening (not shown) is longer than each passage distance of vent on the front seat, and air blowing resistance on the side of the back seat vent is high. Therefore, a volume of air which is in proportion to an area of the opening like the front seat vent cannot be obtained. On the other hand, if the opening area of the back seat vent opening 107 is merely widened, the air conditioner is increased in size. Hence, the back seat auxiliary vent opening 114 is formed in the front seat side vent opening 106, and the volume of air being discharged from the back seat vent blowout opening (not shown) is increased without merely increasing the opening area of the back seat vent opening 107 in the longitudinal direction or widthwise direction of the vehicle.

However, according to the conventional vehicular air conditioner 100, the front seat center vent opening 105 and the front seat side vent opening 106 are disposed in a side-by-side configuration, and the back seat vent opening 107 is disposed around this side-by-side configuration. Therefore, opening areas of the front seat center vent opening 105 and the front seat side vent opening 106 are relatively reduced.

That is, it is required that the front seat center vent opening 105 and the front seat side vent opening 106 are disposed at locations into which cool air enters substantially straightly. However, since the back seat vent opening 107 is also disposed at this desired location, opening areas of the front seat center vent opening 105 and the front seat side vent opening 106 are relatively reduced. If the opening areas of the front seat center vent opening 105 and the front seat side vent opening 106 are reduced, there is a problem that air blowing volumes to the front seat center vent opening 105 and the front seat side vent opening 106 are also reduced. Especially in the above conventional example, since a portion of the front seat side vent opening 106 functions as the back seat auxiliary vent opening 114, the air blowing volume to the front seat side vent opening 106 is further reduced.

If the back seat vent opening 107 is disposed at arbitrary location where an air mix area is desired, conditioned air into which air is not sufficiently mixed is taken in.

SUMMARY OF THE INVENTION

Therefore, it is an object of the present invention to provide a vehicular air conditioner capable of taking, into a back seat vent, conditioned air into which air is sufficiently mixed, without reducing air blowing volume to a front seat vent opening.

To achieve the above object, a first aspect of the present invention provides a vehicular air conditioner in which a defroster opening, a front seat vent opening, and a foot opening are provided at locations opposed to an air mix area in an air conditioner case, a defroster door which opens and closes the defroster opening is provided, and a vent foot switching door which selectively opens and closes the foot opening and a portion of the front seat vent opening is provided, wherein a back seat vent opening is provided near the foot opening, and a back seat vent door which opens and closes the back seat vent opening and a foot door which opens and closes the foot opening are provided downstream from the vent foot switching door.

A second aspect of the present invention provides the vehicular air conditioner according to the first aspect, wherein the back seat vent door and the foot door are opened, closed, and moved integrally.

According to the first aspect, the front seat vent opening can be disposed over the entire region of a position into which cold air substantially straightly enters and thus, an opening area of the front seat vent opening can be sufficiently taken. Since the foot opening is formed in a position where mixed conditioned air can be taken in, sufficiently mixed conditioned air is introduced also into the back seat vent opening formed near the foot opening. From the above reasons, sufficiently mixed conditioned air can be taken into the back seat vent opening without reducing the air blowing volume into the front seat vent opening.

Since the back seat vent door and the foot door are provided at locations downstream from the vent foot switching door, these door does not deteriorate the air mixing performance.

Since there are provided the vent foot switching door which opens and closes the front seat vent opening and the back seat vent door which opens and closes the back seat vent opening, the front seat vent and the back seat vent can be opened and closed independently, and the flexibility of the air-blowing modes can be enhanced.

According to the second aspect, in the air-blowing modes other than the defroster mode, the back seat vent opening is in the opened position to take air in, but if desired control is performed for the foot doors, the back seat vent door is brought into the predetermined position described above. Therefore, it is not necessary to control the back seat vent door independently.

DETAILED DESCRIPTION OF THE PREFERRED EMBODIMENTS

Figure 3:
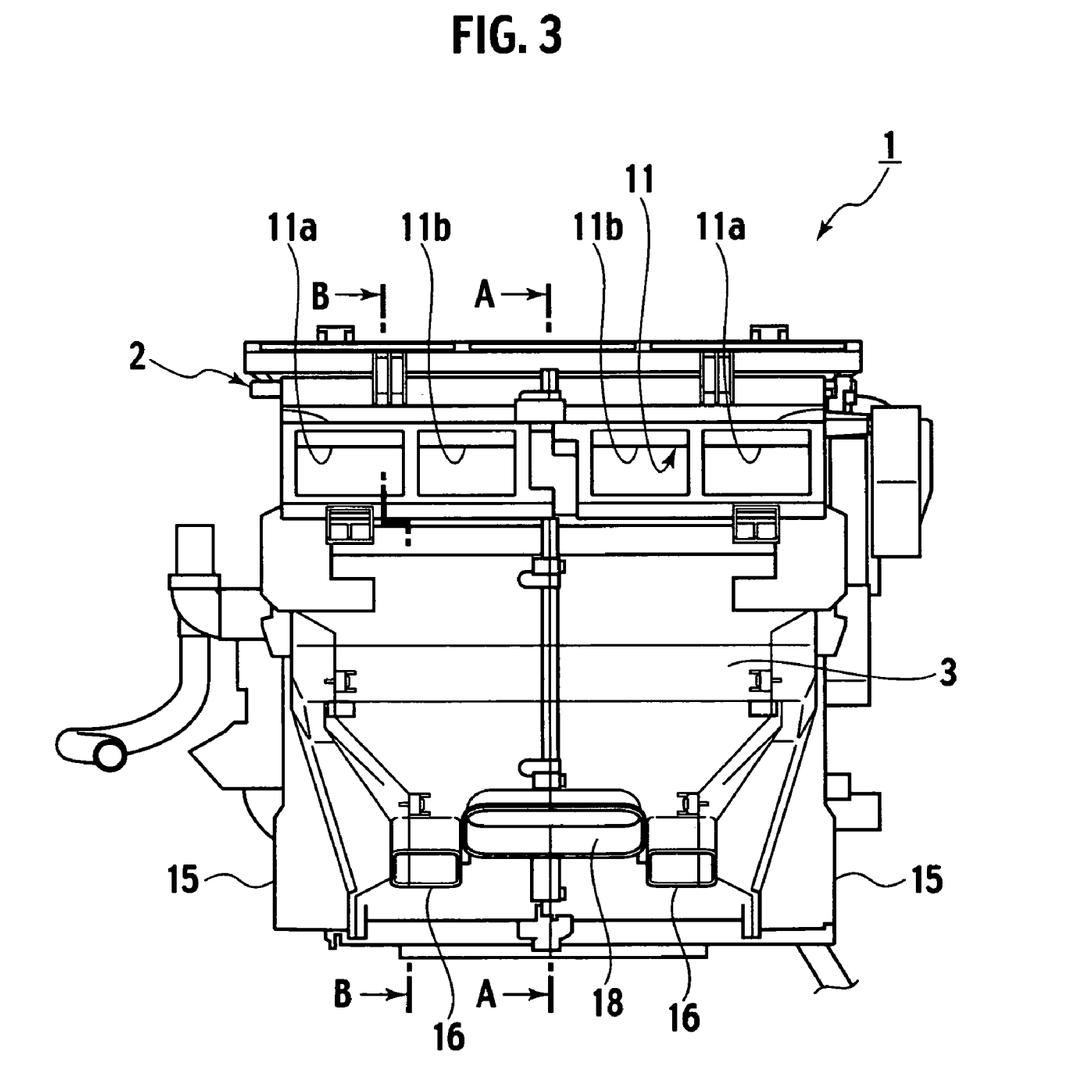
FIG. 3 shows one embodiment of the present invention, and is a diagram of an air conditioner unit as viewed from a passenger room.
Figure 4:
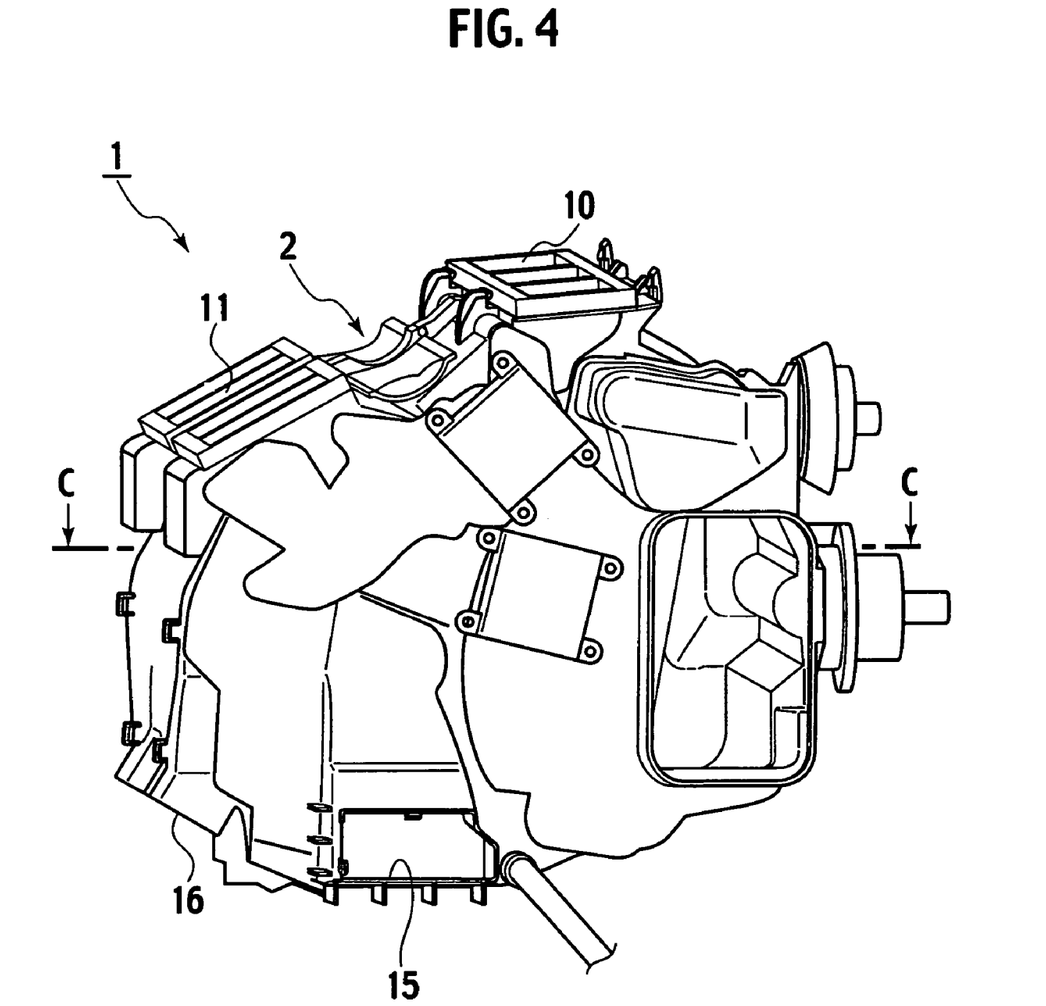
FIG. 4 shows the embodiment, and is a perspective view of the air conditioner unit.
Figure 5:
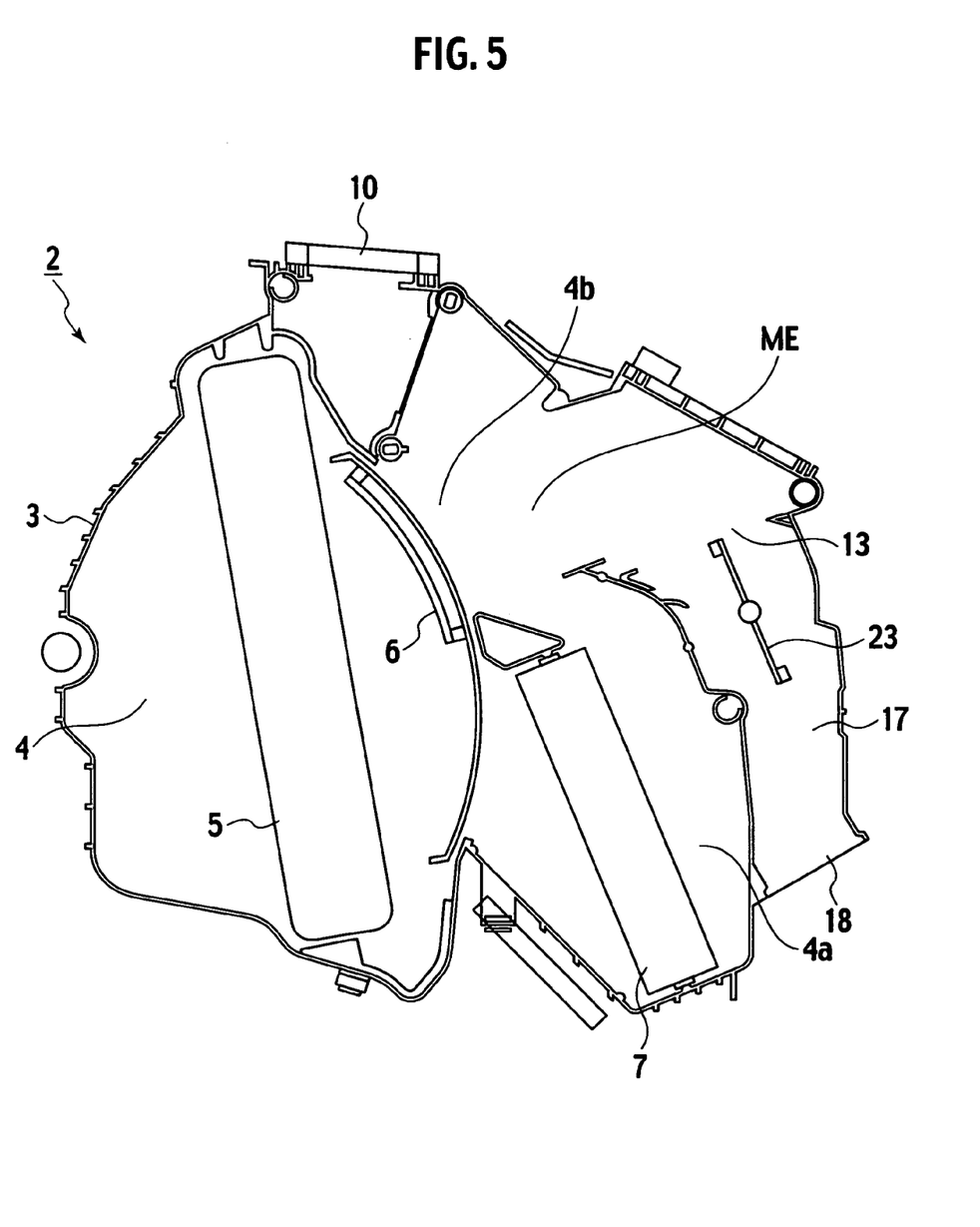
FIG. 5 is a sectional view taken along a line A-A in FIG. 3.
Figure 6:
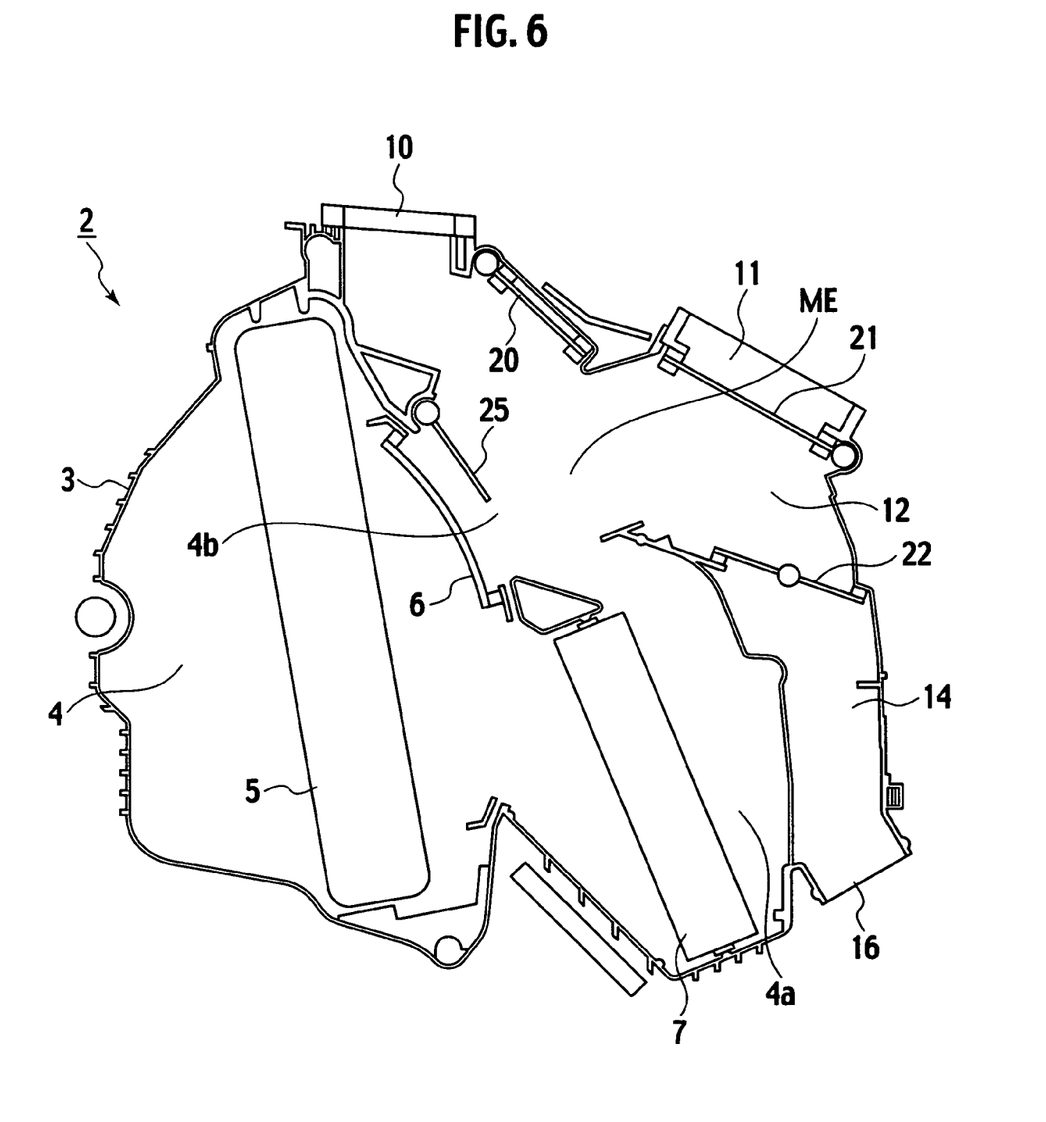
FIG. 6 is a sectional view taken along a line B-B in FIG. 3, when a defroster mode is selected.
Figure 7:
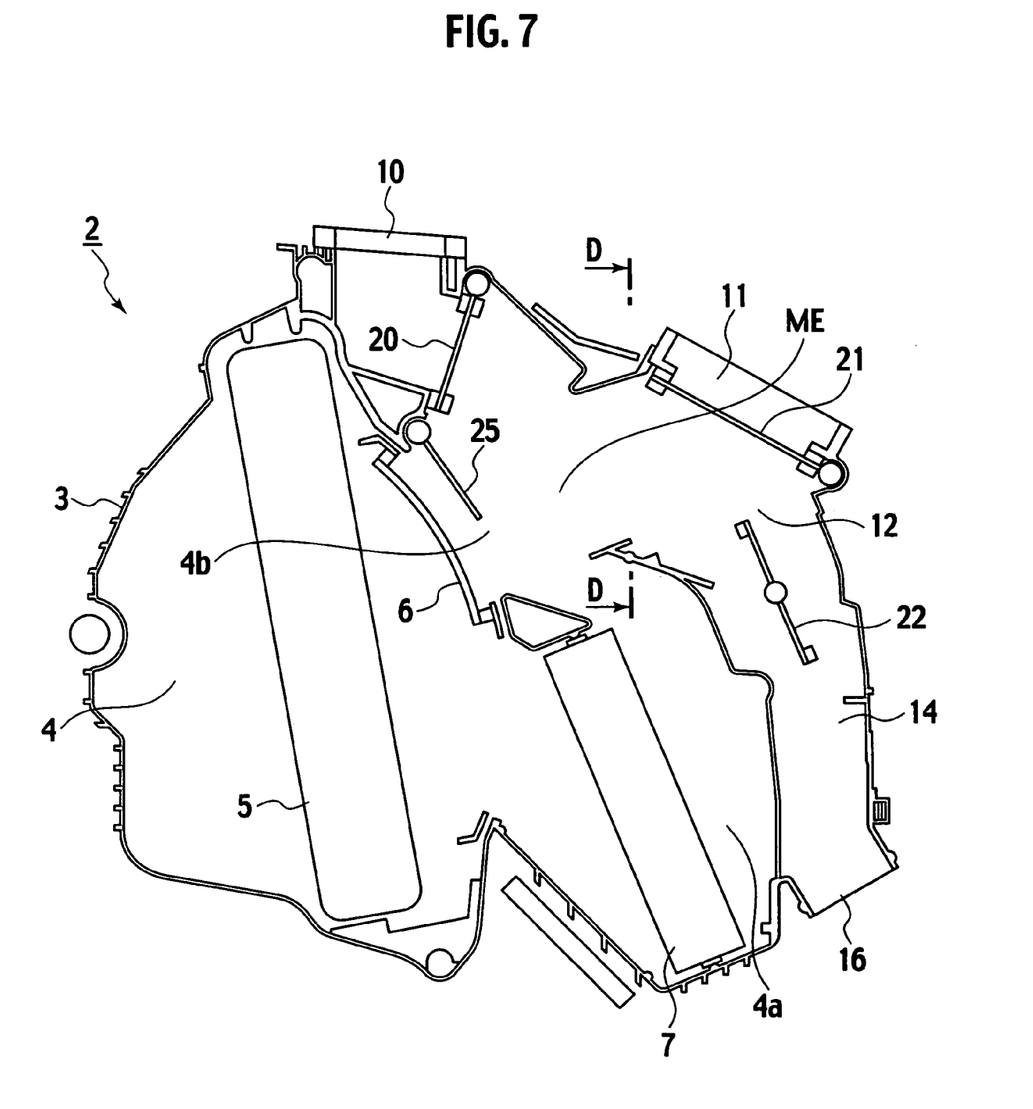
FIG. 7 is a sectional view taken along the line B-B in FIG. 3, when a foot mode is selected.
Figure 8:
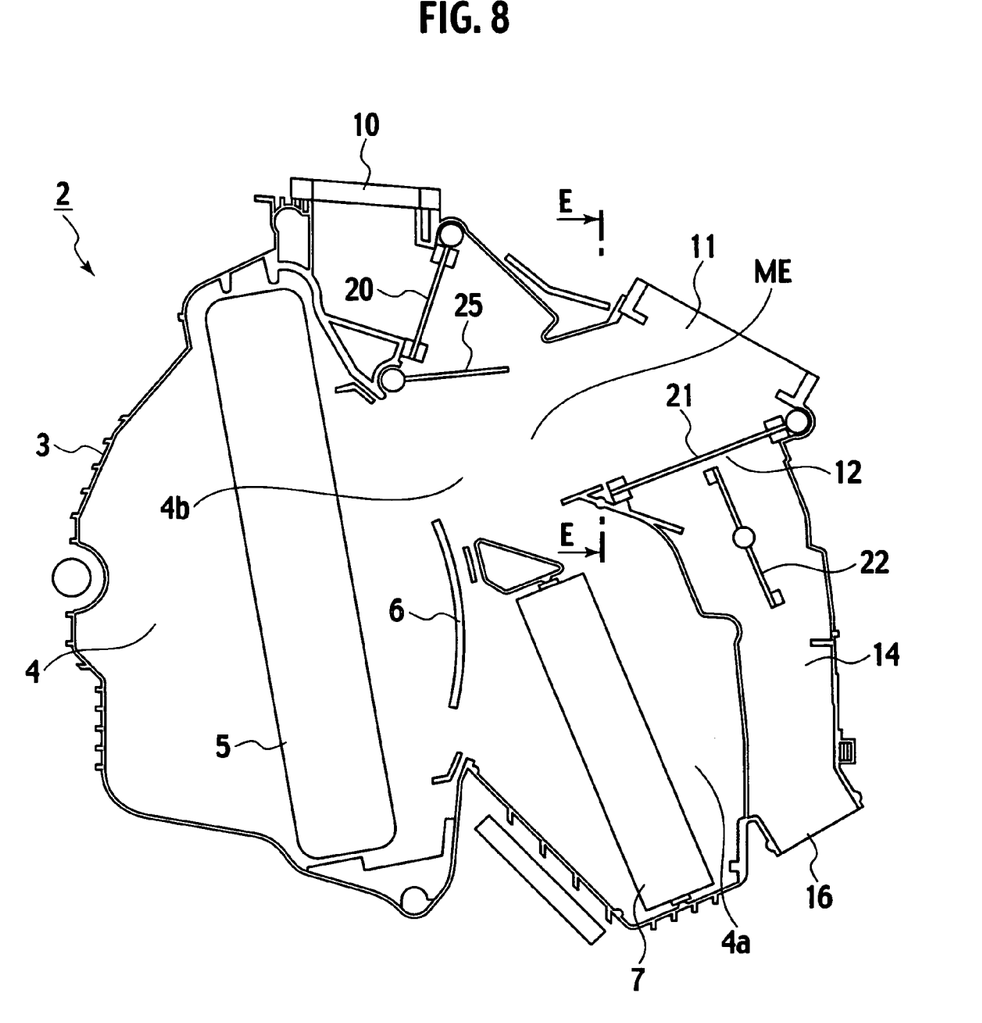
FIG. 8 is a sectional view taken along the line B-B in FIG. 3, when a vent mode is selected.
Figure 9:
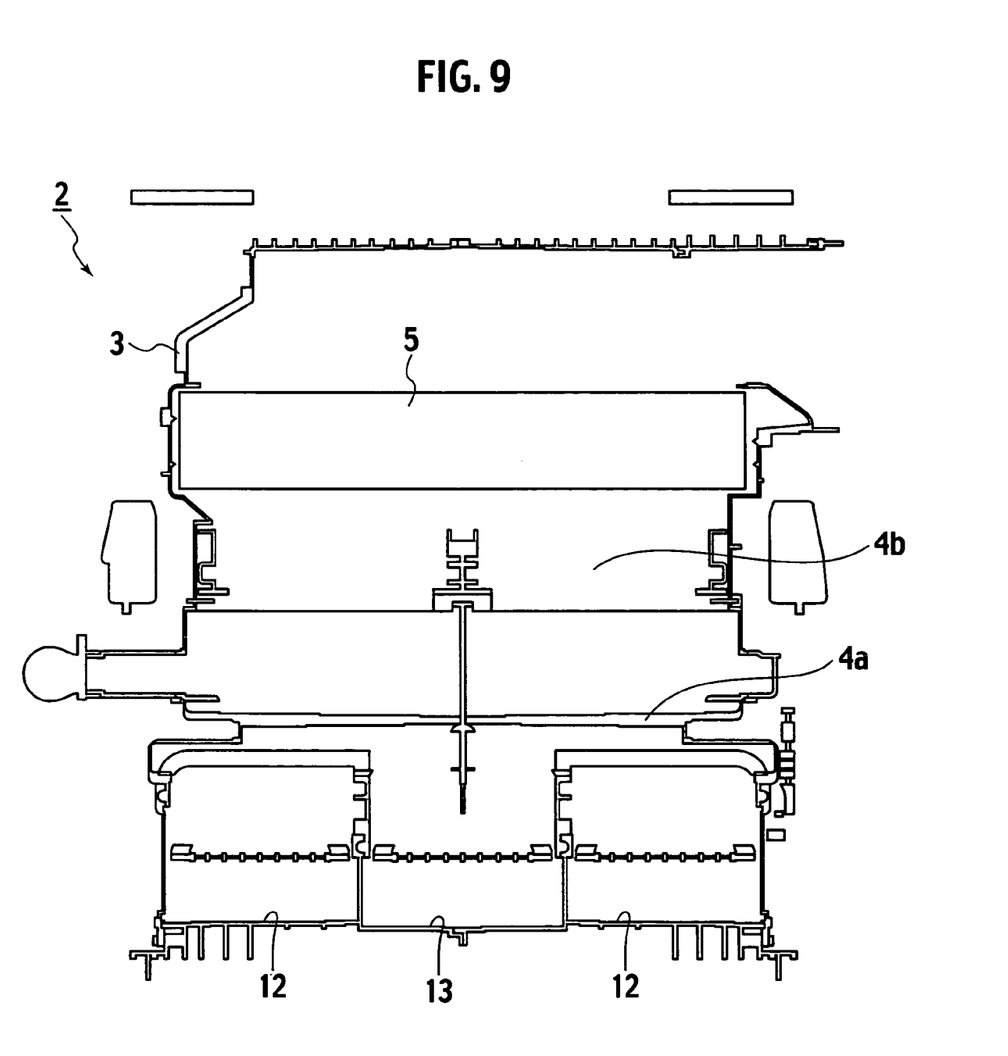
FIG. 9 is a sectional view taken along a line C-C in FIG. 4.
Figure 10:
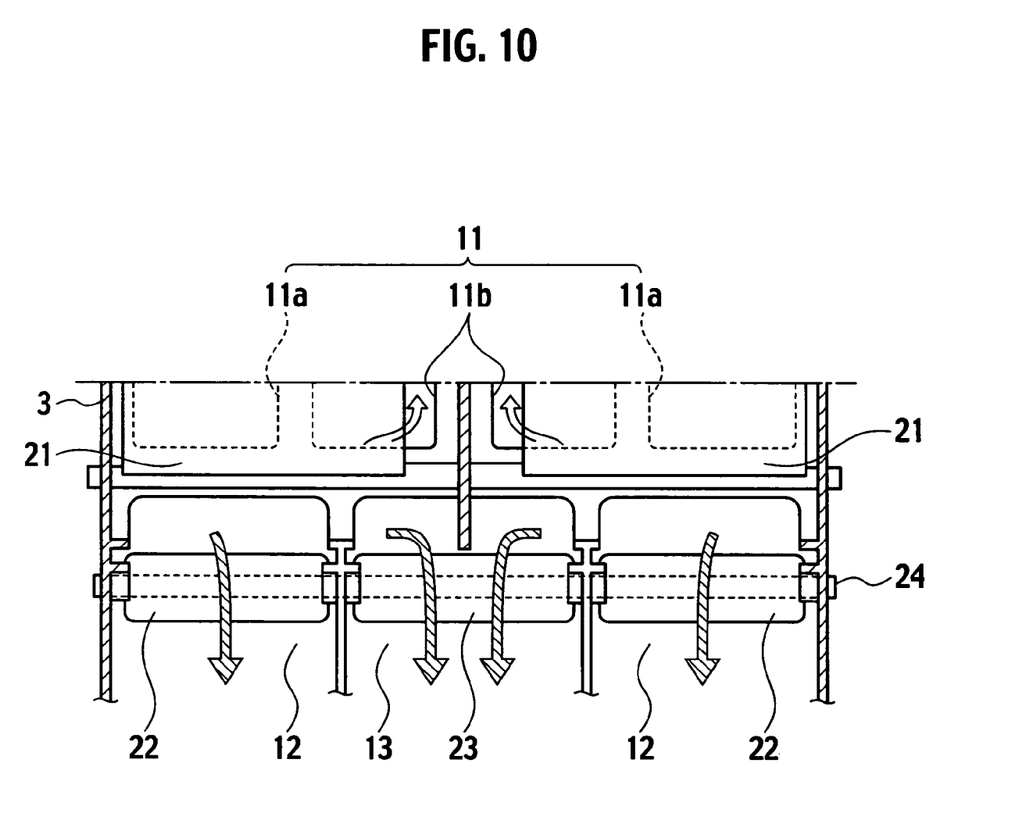
FIG. 10 is a sectional view taken along a line D-D in FIG. 7.
Figure 11:
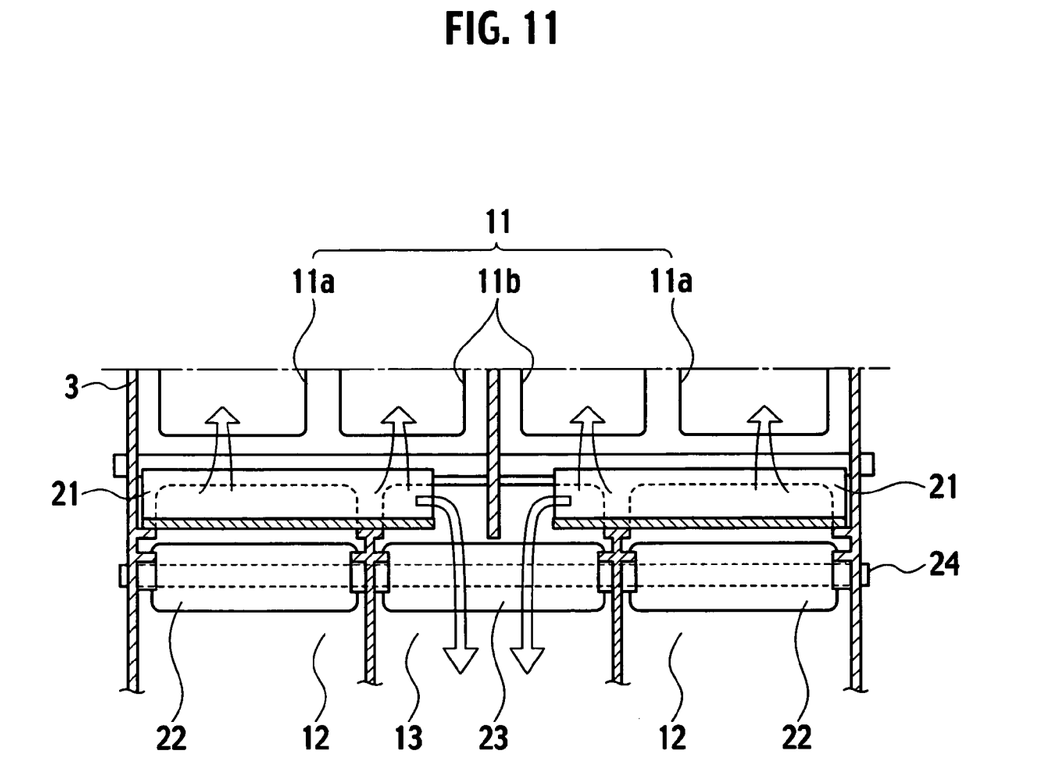
FIG. 11 is a sectional view taken along a line E-E in FIG. 8.

An embodiment of the present invention is explained below in detail with reference to the accompanying drawings. FIGS. 3 to 11 show one embodiment of the present invention, where FIG. 3 is a diagram of an air conditioner unit as viewed from a passenger room; FIG. 4 is a perspective view of the air conditioner unit; FIG. 5 is a sectional view taken along a line A-A in FIG. 3; FIG. 6 is a sectional view taken along a line B-B in FIG. 3, when a defroster mode is selected; FIG. 7 is a sectional view taken along the line B-B in FIG. 3, when a foot mode is selected; FIG. 8 is a sectional view taken along the line B-B in FIG. 3, when a vent mode is selected; FIG. 9 is a sectional view taken along a line C-C in FIG. 4; FIG. 10 is a sectional view taken along a line D-D in FIG. 7; and FIG. 11 is a sectional view taken along a line E-E in FIG. 8.

A vehicular air conditioner 1 is disposed at substantially a central portion of a front area in a passenger room, and includes a blower unit (not shown) and an air conditioner unit 2. The blower unit (not shown) sucks outside air or inside air and sends the air to the air conditioner unit 2. In the air conditioner unit 2, the temperature of air from the blower unit (not shown) is adjusted to a predetermined value, and the air conditioner unit 2 blows the conditioned air. A structure of the air conditioner unit 2 will be explained in detail.

As shown in FIGS. 3 to 9, an air sending passage 4 is formed in an air conditioner case 3 of the air conditioner unit 2. An evaporator 5, an air mix door 6 (shown in FIG. 7 and the like) and a heater core 7 are disposed in the air sending passage 4 from an upstream side in the air blowing direction.

The evaporator 5 cools air into cold air. The heater core 7 heats air into hot air. The air mix door 6 distributes air into a hot air passage 4a passing through the heater core 7 and a cold air passage 4b bypassing the heater core 7 with a predetermined ratio.

An air mix area ME is formed downstream from the hot air passage 4a and the cold air passage 4b. A defroster opening 10, a front seat vent opening 11, a pair of foot openings 12, and a back seat vent opening 13 are formed at location opposed to the air mix area ME of the air conditioner case 3.

The defroster opening 10 is disposed above the air mix area ME. The defroster opening 10 introduces conditioned air to be discharged toward the front window glass of the vehicle, and is connected to a blowout opening (not shown) of the defroster disposed on an upper surface of an instrument panel.

The front seat vent opening 11 is disposed in front of the air mix area ME and at a position into which cold air from the cold air passage 4b enters substantially straightly. As shown in FIGS. 10 and 11 in detail, the front seat vent opening 11 includes a pair of center vent openings 11a and 11a located on laterally outer sides, and a pair of side vent openings 11b and 11b located on laterally inner sides. The center vent openings 11a and 11a introduce conditioned air which is to be discharged toward the upper half of the body of the passenger on the front seat, and are connected to a center vent blowout opening (not shown). The side vent openings 11b and 11b introduce conditioned air to be discharged toward the side window glasses of the vehicle, and are connected to a pair of side vent blowout openings (not shown).

As shown in FIGS. 9 to 11 in detail, the pair of foot openings 12 is disposed at a position in a forward and downward slanting direction of the air mix area ME such as to sandwich the back seat vent opening 13. The foot openings 12 introduce conditioned air to be discharged toward a passenger on the front seat and a passenger on the back seat, and are connected to a front seat foot blowout opening (not shown) disposed below the instrument panel and to a back seat side back seat foot blowout opening (not shown). More specifically, the air conditioner case 3 includes a foot passage 14. One end of the foot passage 14 corresponds to the pair of foot openings 12. The other end of the foot passage 14 is formed with a unit front seat foot blowout opening 15 and a unit back seat foot blowout opening 16. The unit front seat foot blowout opening 15 and the unit back seat foot blowout opening 16 are connected to the front seat foot blowout opening (not shown) and the back seat foot blowout opening (not shown) through ducts (not shown).

The back seat vent opening 13 is disposed between the pair of left and right foot openings 12, i.e., in the vicinity of the foot openings 12. The back seat vent opening 13 introduces conditioned air to be discharged toward the upper half of the body of the passenger on the back seat, and is connected to the back seat side back seat vent blowout opening (not shown). More specifically, the air conditioner case 3 includes a back seat vent passage 17 whose one end corresponds to the back seat vent opening 13, and the other end of the back seat vent passage 17 is formed with a unit back seat vent blowout opening 18. The unit back seat vent blowout opening 18 is connected to the back seat vent blowout opening (not shown) of the vehicle through a duct (not shown). The back seat vent blowout opening (not shown) is provided with a grille (not shown) which opens and closes the back seat vent blowout opening (not shown).

A defroster door 20, a vent foot switching door 21, a pair of foot doors 22, and a back seat vent door 23 are provided in the air conditioner case 3.

The defroster door 20 opens and closes the defroster opening 10. The vent foot switching door 21 opens and closes the front seat vent openings 11 (center vent openings 11a and 11a, and side vent openings 11b and 11b) and the foot opening 12. In this regard, as shown in FIG. 10, only portions of the side vent openings 11b and 11b are not closed even in their vent fully-closed positions.

The pair of foot doors 22 is disposed downstream from the vent foot switching door 21. The pair of foot openings 12 is substantially opened and closed by opening and closing the foot passage 14.

Similarly, the back seat vent door 23 is disposed downstream from the vent foot switching door 21, and the back seat vent opening 13 is substantially opened and closed by opening and closing the back seat vent passage 17. The back seat vent door 23 and the foot doors 22 are pivotally supported by the same support shaft 24 so that the back seat vent door 23 and the foot doors 22 are opened, closed, and moved integrally.

A maximum cool door 25 is provided in the air conditioner case 3. The maximum cool door 25 is used for introducing the maximum amount of cold air into the front seat vent opening 11.

In the above structure, if the defroster mode is selected, as shown in FIG. 6, the defroster door 20 is in the fully-opened position, the vent foot switching door 21 is in the vent fully-closed position, and the foot door 22 and the back seat vent door 23 are in the foot fully-closed position and the back seat vent fully-closed position. Conditioned air into which air is mixed in the air mix area ME is introduced into the defroster opening 10 and discharged into the passenger room from the defroster blowout opening (not shown). Since the portions of the side vent openings 11b and 11b are not closed even in the vent fully-closed position of the vent foot switching door 21, a portion of the conditioned air is discharged into the passenger room from the side vent blowout opening (not shown).

If the foot mode is selected, as shown in FIGS. 7 and 10, the defroster door 20 is in the fully-closed position, the vent foot switching door 21 is in the vent fully-closed position, and the foot door 22 and the back seat vent door 23 is in the foot fully-opened position and the back seat vent fully-opened position. Conditioned air into which air is mixed in the air mix area ME is introduced into the foot opening 12 and the back seat vent opening 13. The conditioned air introduced into the foot opening 12 is discharged toward the front seat through the foot passage 14 and the like and into the passenger room from the back seat foot blowout opening (not shown). Conditioned air introduced into the back seat vent opening 13 is discharged into the passenger room from the back seat vent blowout opening (not shown) through the back seat vent passage 17. Since portions of the side vent openings 11b and 11b are not closed even in the vent fully-closed position of the vent foot switching door 21, a portion of the conditioned air is discharged into the passenger room from the side vent blowout opening.

If the vent mode is selected, as shown in FIGS. 8 and 11, the defroster door 20 is in the fully-closed position, the vent foot switching door 21 is in the foot fully-closed position, and the foot door 22 and the back seat vent door 23 are in the foot fully-opened position and the back seat vent fully-opened position. With this, the conditioned air is introduced into the front seat vent opening 11 and the back seat vent opening 13. Conditioned air introduced into the front seat vent opening is discharged into the passenger room from the front seat center vent blowout opening (not shown) and the front seat side vent blowout opening (not shown). Conditioned air introduced into the back seat vent opening 13 is discharged into the passenger room from the back seat vent blowout opening (not shown) through the back seat vent passage 17 and the like.

As explained above, according to the vehicular air conditioner 1, the back seat vent opening 13 is provided near the foot openings 12, and the back seat vent door 23 which opens and closes the back seat vent opening 13 and the foot doors 22 which open and close the foot openings 12 are provided downstream from the vent foot switching door 21. Therefore, the front seat vent opening 11 can be disposed over the entire region of a position into which cold air substantially straightly enters and thus, the opening area of the front seat vent opening 11 can be secured sufficiently. Since the foot opening 12 is formed in a position where mixed conditioned air can be sufficiently taken in, sufficiently mixed conditioned air is introduced also into the back seat vent opening 13 formed near the foot opening 12. From the above reasons, sufficiently mixed conditioned air can be taken into the back seat vent opening 13 without reducing the air blowing volume into the front seat vent opening 11.

Since the back seat vent door 23 and the foot doors 22 are provided downstream from the vent foot switching door 21, air mixing degree of the doors 22 and 23 is not deteriorated. That is, if the back seat vent door 23 and the foot doors 22 are provided at substantially the same position as the vent foot switching door 21, flow of conditioned air from the air mix area ME to each opening is influenced by the position of the door, and there is an adverse possibility that the air mixing degree is deteriorated. In this embodiment, however, since the back seat vent door 23 and the foot doors 22 are disposed in the back seat vent passage 17 and the foot passage 14, the flow of conditioned air is not influenced by the position of the door, and the air mixing degree is not deteriorated.

Since there are provided the vent foot switching door 21 which opens and closes the front seat vent opening 11 and the back seat vent door 23 which opens and closes the back seat vent opening 13, it is possible to independently open and close the front seat vent and the back seat vent, and the flexibility of the air-blowing modes can be enhanced.

In this embodiment, conditioned air is introduced into the front seat side vent openings 11b and 11b in all of the air-blowing modes, and conditioned air is discharged from the front seat side vent blowout opening (not shown). This prevents flogging on a side window glass of a vehicle in a cold climate.

In this embodiment, the back seat vent door 23 and the foot doors 22 are opened, closed and moved integrally. That is, in the air-blowing modes other than the defroster mode, the back seat vent opening 13 is in the opened position to take air in, but if desired control is performed for the foot doors 22, the back seat vent door 23 is brought into the predetermined position described above. Therefore, it is not necessary to control the back seat vent door 23 independently.

What is claimed is:

1. A vehicular air conditioner comprising:

an air conditioner case including an air mix area, wherein a defroster opening, a front seat vent opening, a foot opening, and a back seat vent opening are located on the air conditioner case and are configured to open the air mix area;

a defroster door configured to open and close the defroster opening;

a vent foot switching door configured to open and close the foot opening and a portion of the front seat vent opening selectively;

a back seat vent door configured to open and close the back seat vent opening; and a foot door configured to open and close the foot opening, wherein the back seat vent opening is positioned in a vicinity of the foot opening, and wherein the back seat vent door and the foot door are downstream from the vent foot switching door.

2. The vehicular air conditioner according to claim 1, wherein the back seat vent door and the foot door are configured to open and close together.

* * * * *